United States Patent
Lee et al.

(10) Patent No.: US 7,066,601 B2
(45) Date of Patent: Jun. 27, 2006

(54) PROJECTION DISPLAY HAVING AN ILLUMINATION MODULE AND AN OPTICAL MODULATOR

(75) Inventors: Young-chol Lee, Suwon-si (KR); Yasunori Kuratomi, Seongnam-si (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 0 days.

(21) Appl. No.: 10/697,803

(22) Filed: Oct. 31, 2003

(65) Prior Publication Data

US 2004/0207822 A1 Oct. 21, 2004

(30) Foreign Application Priority Data

Apr. 15, 2003 (KR) .................. 10-2003-0023726

(51) Int. Cl.
*G03B 21/14* (2006.01)
*G02F 1/1335* (2006.01)

(52) U.S. Cl. .................. 353/31; 353/122; 353/20; 349/62; 349/69; 362/555

(58) Field of Classification Search .................. 353/20, 353/22, 29, 33, 34, 69, 81, 85–87, 97, 102, 353/28, 98, 99, 119, 122, 31; 349/5, 8–10, 349/61–65, 69; 362/551, 555, 558–561, 362/581, 580, 582
See application file for complete search history.

(56) References Cited

U.S. PATENT DOCUMENTS

| | | | | |
|---|---|---|---|---|
| 5,146,248 A * | 9/1992 | Duwaer et al. | ............. | 353/122 |
| 5,808,709 A * | 9/1998 | Davis et al. | .................. | 349/65 |
| 5,914,760 A * | 6/1999 | Daiku | ......................... | 349/65 |
| 6,005,722 A * | 12/1999 | Butterworth et al. | ....... | 359/712 |
| 6,272,269 B1 * | 8/2001 | Naum | ......................... | 385/43 |
| 6,273,577 B1 | 8/2001 | Goto et al. | | |
| 6,318,863 B1 * | 11/2001 | Tiao et al. | ..................... | 353/31 |
| 6,435,682 B1 * | 8/2002 | Kaelin et al. | ................. | 353/31 |
| 6,508,564 B1 * | 1/2003 | Kuwabara et al. | ............ | 362/31 |
| 6,540,377 B1 * | 4/2003 | Ota et al. | .................... | 362/231 |
| 6,545,814 B1 * | 4/2003 | Bartlett et al. | ............. | 359/636 |
| 6,554,463 B1 * | 4/2003 | Hooker et al. | ............. | 362/555 |
| 6,799,849 B1 * | 10/2004 | Kim et al. | .................... | 353/30 |
| 6,814,442 B1 * | 11/2004 | Okuyama et al. | ............ | 353/20 |
| 2003/0187344 A1 * | 10/2003 | Nilson et al. | ............... | 600/407 |
| 2004/0263804 A1 * | 12/2004 | Basey et al. | ................ | 353/119 |

FOREIGN PATENT DOCUMENTS

JP      2003-086003      3/2003

* cited by examiner

*Primary Examiner*—W. B. Perkey
*Assistant Examiner*—Andrew Sever
(74) *Attorney, Agent, or Firm*—Sughrue Mion, PLLC (57) ABSTRACT

Provided is a projection display including an illumination module. The illumination module includes a light source including a plurality of light emitting devices, a light guide panel having a top surface from which light is emitted, the top surface facing the optical modulator, and an edge surface on which light is incident, and an optical transport member for guiding light emitted from the light source to the edge surface of the light guide panel, the section of the optical transport member parallel to the edge surface increasing in size from the edge surface to the light source.

8 Claims, 8 Drawing Sheets

PROJECTION DISPLAY HAVING AN ILLUMINATION MODULE AND AN OPTICAL MODULATOR

BACKGROUND OF THE INVENTION

This application claims the priority of Korean Patent Application No. 2003-23726, filed on Apr. 15, 2003, in the Korean Intellectual Property Office, the disclosure of which is incorporated herein in its entirety by reference.

1. Field of the Invention

The present invention relates to a projection display that projects an enlarged image onto a screen.

2. Description of the Related Art

In recent years, projection displays that project an enlarged image, which has been modulated by an optical modulator such as a liquid crystal panel, onto a screen have become popular.

Figure 1:
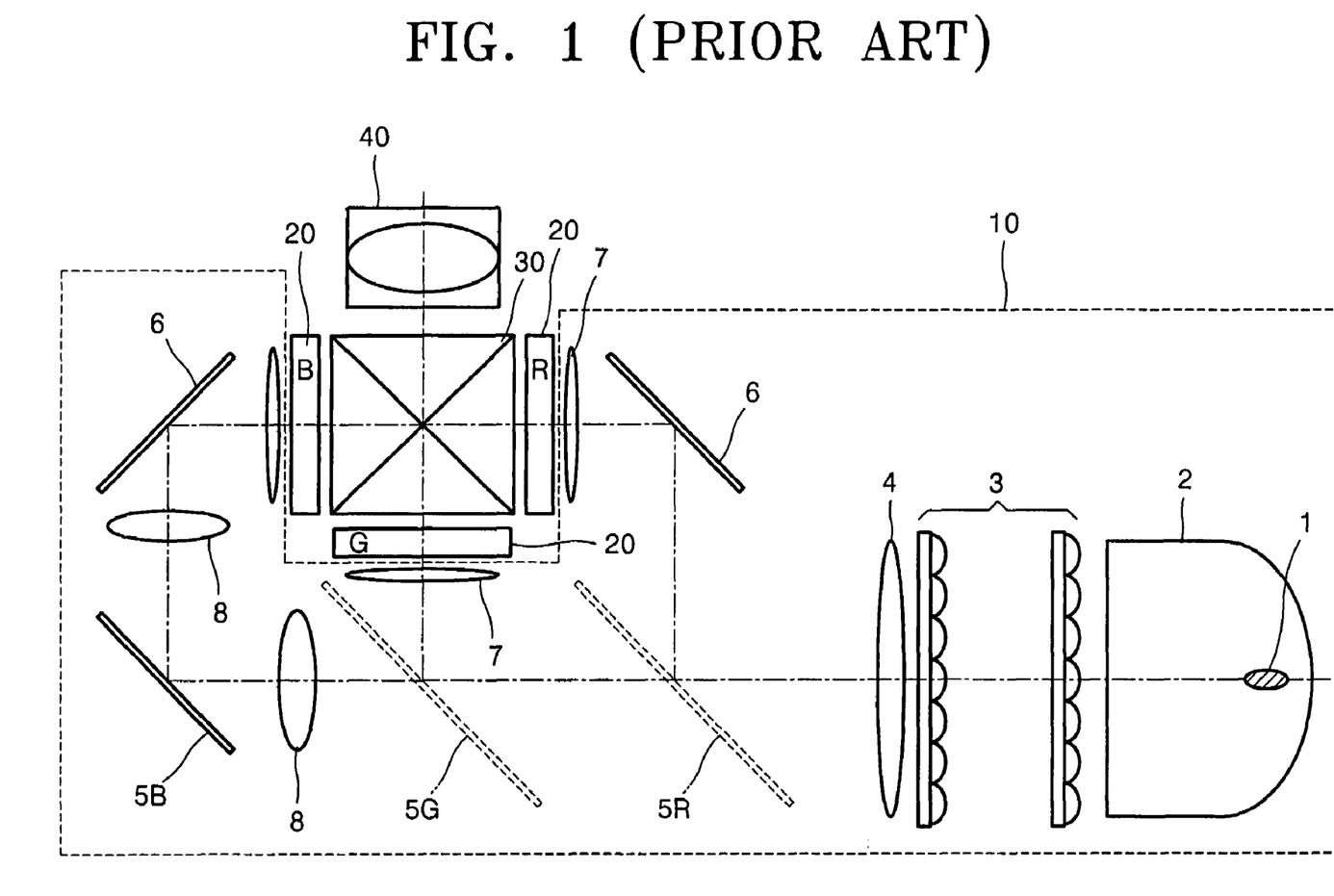
FIG. 1 is a schematic diagram illustrating the configuration of a conventional projection display.

FIG. 1 is a schematic diagram illustrating the configuration of a conventional projection display.

Referring to FIG. 1, a conventional projection display comprises a liquid crystal panel 20 which is an optical modulator, an illumination module 10 for emitting light to the liquid crystal panel 20, and a projection lens 40 for projecting a modulated image on an enlarged scale.

The projection display includes three liquid crystal panels 20R, 20G and 20B corresponding to colored images, namely, red (R) image, green (G) image and blue (B) image, respectively. Reference numeral 30 represents a synthesis prism which synthesizes light which has been modulated by the liquid crystal panels 20R, 20G and 20B to respectively correspond to colored images, and radiates the light to the projection lens 40.

The illumination module 10 includes a light source 1, an integrator 3, a condenser lens 4, a plurality of mirrors 5R, 5G, 5B, and 6, and a plurality of relay lenses 7 and 8.

A metal halide lamp, a high pressure mercury lamp, or the like, is used as the light source 1. The light source 1 is positioned at a focal point of a reflecting mirror 2 having a paraboloidal surface to obtain parallel light. The integrator 3 is used to uniformly illuminate the liquid crystal panels 20R, 20G and 20B. In general, a couple of fly-eye lenses which are formed in a two-dimensional micro lens are used as the integrator 3. Light which has been passed through the integrator 3 is focused by the condenser lens 4. The mirrors 5R, 5G and 5B are selective reflecting mirrors which reflect red light, green light and blue light, respectively, and transmit other colors of light. Light is divided into red light, green light and blue light while passing through the mirrors 5R, 5G, and 5B. Three lights are passed through the relay lenses 7 and 8, and are incident on the liquid crystal panels 20R, 20G and 20B, respectively. The liquid crystal panels 20R, 20G and 20B modulate the incident light and output R, G and B images. Light respectively emitted from the liquid crystal panels 20R, 20G and 20B is synthesized by the synthesis prism 30 and projected, on an enlarged scale, by the projection lens 40.

The life span of a lamp which is used as the light source of the conventional projection display is several thousands of hours at the longest. Therefore, when the conventional projection display is used a lot, it has a drawback in that the lamp should be replaced often. The conventional projection display has another drawback in that a plurality of mirrors and lenses are used and accordingly an illumination module is quite large.

Japanese Patent Laid-open Publication No. 2001-42431 discloses an illumination module using a light emitting diode (LED), which also requires lots of lenses and mirrors. Thus, there is a limit to downsizing the illumination module.

SUMMARY OF THE INVENTION

The present invention provides a projection display employing an improved illumination module which includes a plurality of light emitting devices and a light guide panel to realize a smaller projection display and achieve a longer life span.

According to an aspect of the present invention, there is provided a projection display comprising: an illumination module; and an optical modulator for modulating light incident from the illumination module in response to image data, wherein the illumination module comprises: a light source comprising a plurality of light emitting devices; a light guide panel comprising a top surface from which light is emitted, the top surface facing the optical modulator, and an edge surface on which light is incident; and an optical transport member for guiding light emitted from the light source to the edge surface of the light guide panel, the cross-sectional area of the optical transport member parallel to the edge surface increasing from the edge surface to the light source.

The light source may comprise a plurality of light emitting device arrays in which a plurality of light emitting devices are aligned, and the light emitting device may be a light emitting diode.

The optical transport member may be made of a transparent material, and may comprise a light emitting portion facing the edge surface, a light incident portion facing the light source, and a body portion connecting the light incident portion to the light emitting portion.

The outer peripheral surfaces of the body portion may be processed to reflect light to the inside of the body portion.

The body portion may comprise a plurality of stair portions each of which comprises a first surface parallel to a direction in which the light travels and a second surface reflection-processed, the first surface and the second surface forming a predetermined angle therebetween.

The light incident portion may comprise a plurality of light incident surfaces which are inclined with respect to the light traveling direction, and at least one light emitting device array in which a plurality of light emitting devices are aligned may be positioned to correspond to the light incident surface.

The light emitting device may comprise a light emitting diode.

The optical transport member may be made of a material comprising the same refractive index as the light guide panel, and the optical transport member may be integrally formed with the light guide panel.

The optical transport member may comprise an optical tunnel in the form of a hollow rectangular pipe whose inner surface reflects light.

According to another aspect of the present invention, there is provided a projection display comprising: an illumination module; and an optical modulator for modulating light incident from the illumination module in response to image data, wherein the illumination module comprises: a light source comprising a plurality of light emitting devices; and a light guide panel comprising a top surface from which light is emitted, the top surface facing the optical modulator, and an optical transport portion extending from a virtual edge surface crossing the top surface and increasing in size from the virtual edge surface toward the light source.

The outer peripheral surfaces of the light transport portion other than the surface facing the light source may be processed to reflect light.

The optical transport portion may be integrally formed with the light guide panel.

The optical transport portion may comprise a plurality of stair portions comprising a first surface parallel to a light traveling direction and a second surface reflection-processed, the first surface being orthogonal to the second surface.

The optical transport portion may comprise a plurality of light incident surfaces on which light is incident from the light source, the plurality of incident surfaces being inclined with respect to the light traveling direction, and at least one light emitting device array may be positioned to correspond to the light incident surface.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 2:
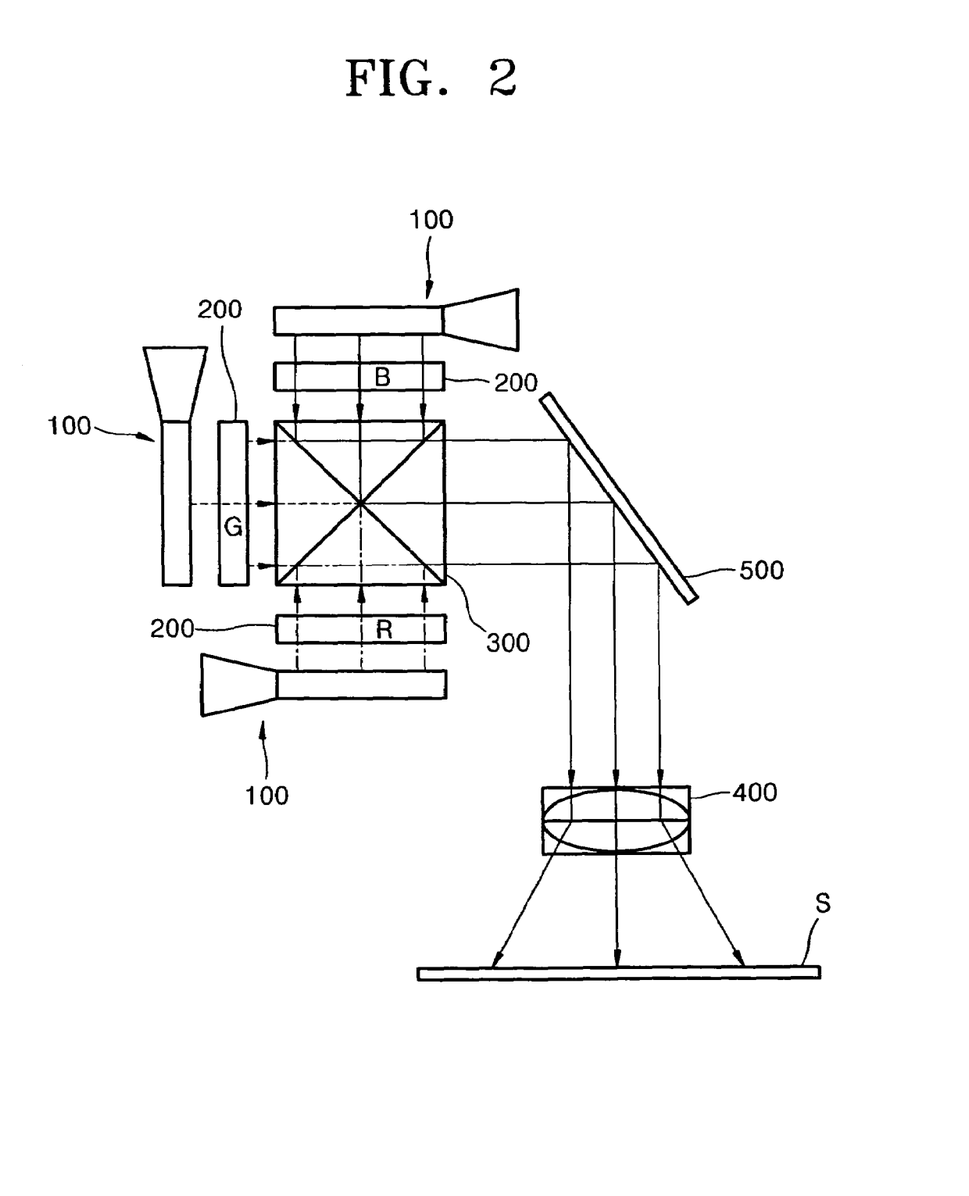
FIG. 2 is a schematic diagram of a projection display according to an exemplary embodiment of the present invention.

FIG. 2 is a schematic diagram illustrating the configuration of a projection display according to an exemplary embodiment of the present invention.

Referring to FIG. 2, a projection display according to the present embodiment includes liquid crystal panels 200R, 200G, and 200B, three illumination modules 100 for illuminating the liquid crystal panels 200R, 200G, and 200B, a synthesis prism 300 for synthesizing three colored light beams which are respectively modulated by liquid crystal panels 200R, 200G and 200B, and a projection optical system 400 for projecting synthesized light on an enlarged scale onto a screen S. Reference numeral 500 is a reflecting mirror which guides light which has passed through the synthesis prism 300 to the projection optical system 400.

The liquid crystal panel 200 is a projection-type optical modulator which modulates light radiated from the illumination modules 100 in response to image data to output the light. The liquid crystal panel 200 is a small liquid crystal panel about one inch wide and one inch long.

Figure 3:
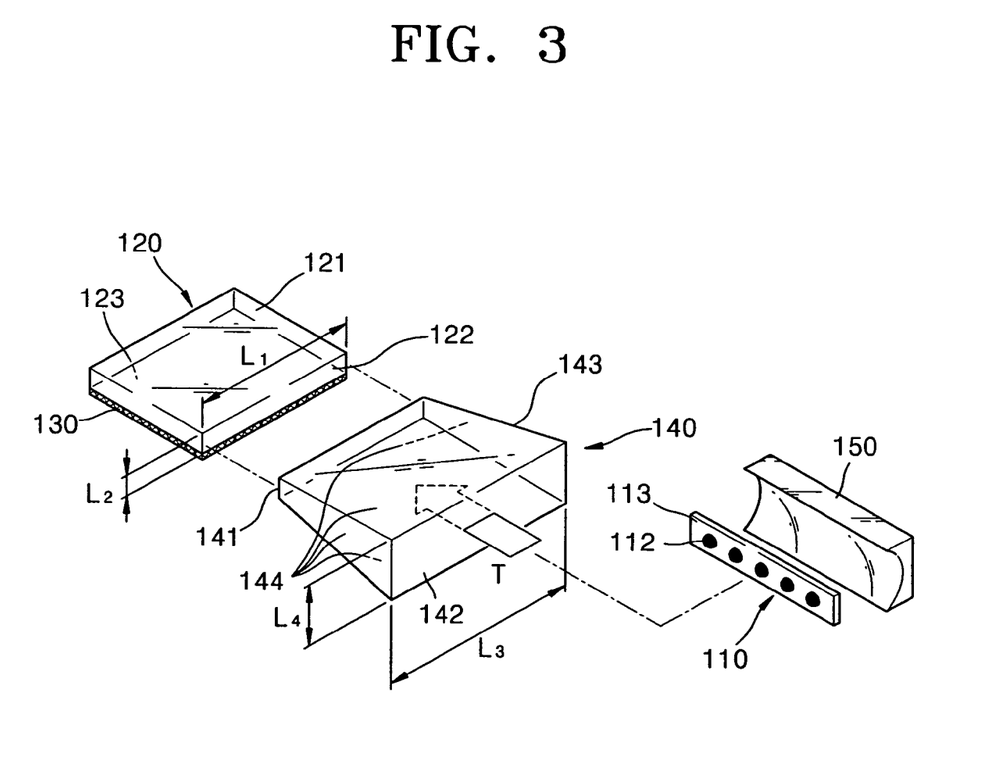
FIG. 3 is a perspective view of an illumination module employed in the projection display shown in FIG. 2 according to a first exemplary embodiment of the present invention.
Figure 4:
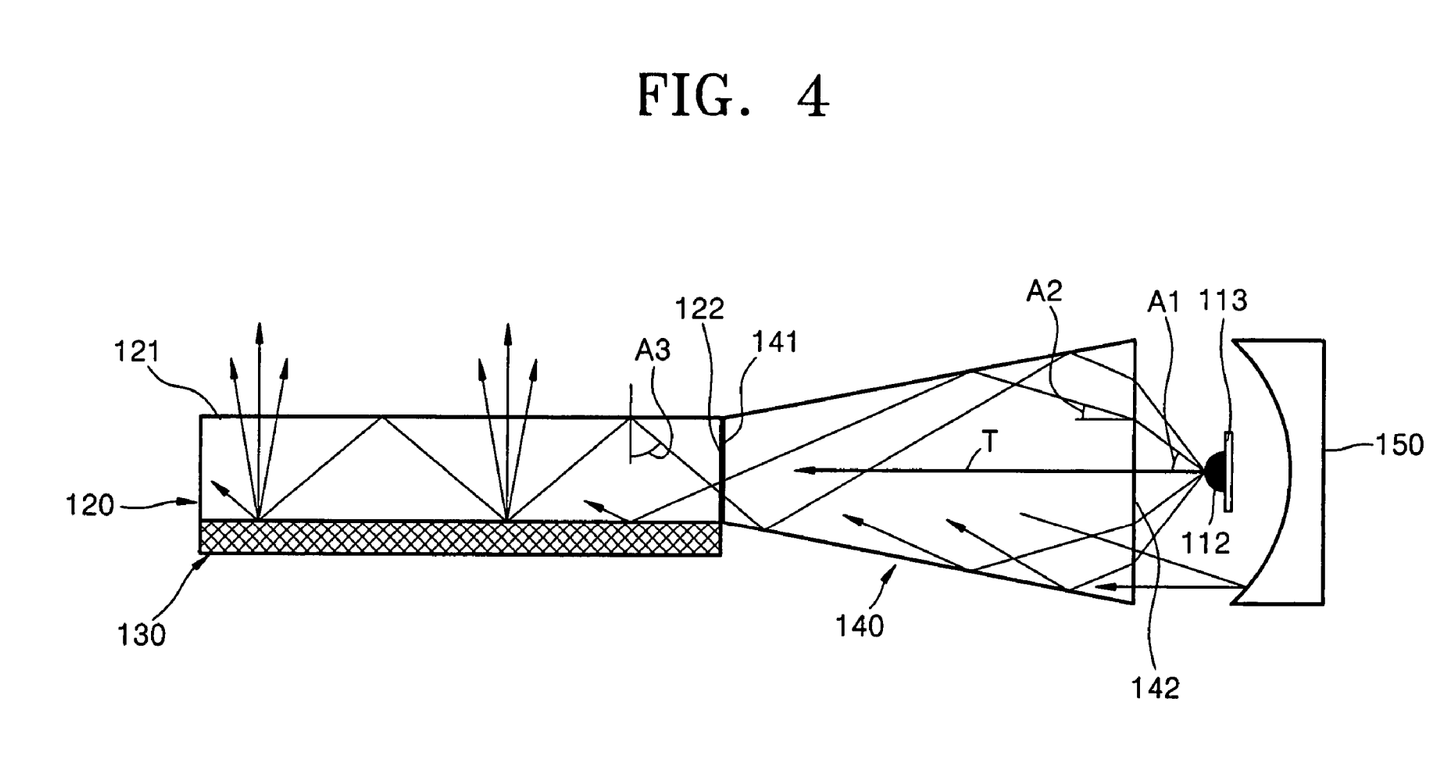
FIG. 4 is a cross-sectional view of the illumination module employed in the projection display shown in FIG. 2 according to the first exemplary embodiment of the present invention.

FIGS. 3 and 4 are a perspective and a cross-section view, respectively, illustrating the illumination module 100 of the projection display shown in FIG. 2 according to a first exemplary embodiment of the present invention.

Referring to FIGS. 3 and 4, each of the illumination modules 100 includes a light source 110, a light guide panel 120 and an optical transport member 140.

The light guide panel 120 guides light by a total reflection. In general, the light guide panel 120 is configured in the form of a flat panel one inch wide and one inch long when the liquid crystal panel 200 needs to be illuminated. The light guide has a top surface 121 which emits light and faces the liquid crystal panel 200, and an edge surface 122 on which light is incident, the top surface 121 crossing the edge surface 122. The light guide panel 120 is made of a transparent material, such as glass, transparent acrylic resin (polymethylmethacrylate (PMMA)) or transparent olefinic resin, a refractive index of which is approximately 1.5.

When an incident angle A3 of light inside the light guide panel 120, with respect to the top surface 121, is smaller than a critical angle of the light guide panel 120, the light can be transmitted through the top surface 121. Otherwise, the light is totally reflected. Since an incident angle of light which has been totally reflected once, with respect to the top surface 121, is not changed unless a propagation angle thereof is changed, the light cannot be transmitted through the top surface 121 of the light guide panel 120. Therefore, an optical angle converter 130 is disposed on a bottom surface 123 of the light guide panel 120 to change an angle of light propagating inside the light guide panel 120. The optical angle converter 130 may be a scattering pattern which scatters light, or a diffraction pattern which diffracts light. The optical angle converter 130 may be formed such that the closer it is to the edge surface 122 on which light is incident, the sparser its pattern distribution is, whereas the farther it is from the edge surface 122, the denser its pattern distribution is. The optical angle converter 130 may be disposed on the top surface 121 of the light guide panel 120, or on both the top surface 121 and the bottom surface 123. According to the present embodiment, the optical angle converter 130 is disposed on the bottom surface 123 of the light guide panel 120.

The optical transport member 140 is interposed between the light source 110 and the edge surface 122 of the light guide panel 120 to guide light emitted from the light source 110 to the edge surface 122. The optical transport member 140 of the present embodiment is made of a transparent material. The optical transport member 140 includes a light emitting portion 141 facing the edge surface 122 of the light guide panel 120, a light incident portion 142 facing the light source 110, and a body portion 143 connecting the light incident portion 142 to the light emitting portion 141.

t In the exemplary embodiment, the light emitting portion 141 has substantially the same shape as the edge surface 122 of the light guide panel 120 and is formed in contact with the edge surface 122. In the exemplary embodiment, the light incident portion 142 on which light radiated from the light source 110 is incident has a sectional area parallel to the edge surface 122 that is larger than an area of the edge surface 122. Thus, the optical transport member 140 has a cubic shape which is enlarged from the light emitting portion 141 to the light incident portion 142 as a whole.

While the optical transport member 140 is shown in FIGS. 3 and 4 to have a width L3 and a length L4, of the light incident portion 142, that are greater than a width L1 and a length L2, of the edge surface 122, this is illustrative only and is not intended to limit the scope of the present invention. The width L3 of the light incident portion 142 may be the same as the width L1 of the edge surface 122 and the length L4 of the light incident surface 142 may be greater than the length L2 of the edge surface 122. Alternatively, the length L4 of the light incident portion 142 may be the same as the length L2 of the edge surface and the width L3 of the light incident surface 142 may be greater than the width L1 of the edge surface 122.

The optical transport member 140 is preferably made of a material having the same refractive index as the light guide panel 120, and more preferably made of the same material as the light guide panel 120. The optical transport member 140 of the present embodiment is made of the same material as the light guide panel 120.

Light incident through the light incident portion 142 and transmitted into the inside of the optical transport member 140 repeatedly undergoes total reflection at the outer peripheral surfaces 144 of the body portion 143 to thus propagate to the light emitting portion 141 and be incident on the light guide panel 120 through the edge surface 122.

To improve optical transport efficiency by means of the optical transport member 140, in the exemplary embodiment, the outer peripheral surfaces 144 of the body portion 143 are processed using a reflex coating or the like to reflect light. This is because the outer peripheral surfaces 144 of the body portion 143 are inclined relative to a direction T in which light travels. When light totally reflected at the outer peripheral surfaces 144 is incident on the outer peripheral surfaces 144 again, an incident angle thereof becomes smaller than a critical angle. Accordingly, the light is not reflected but is transmitted through the outer peripheral surfaces 144, thereby causing optical loss.

The light source 110 is formed in such a manner that light can be incident on the light incident portion 142. A plurality of light emitting devices 112 may be used as the light source 110. One or more light emitting arrays 113 in which a plurality of light emitting devices are aligned may be used as the light source. A light emitting diode (LED), a laser diode, an organic electro-luminescent (EL) device or the like can be used as the light emitting devices 112. In the present embodiment, the light emitting device array 113 is used as the light source 110, and LEDs are used as the light emitting devices 112.

A reflecting mirror 150 is preferably disposed around the light source 110. The reflecting mirror 150 reflects light radiated from the light source 110 to be incident on the optical transport member 140. Also, the reflecting mirror 150 reflects light exiting from the optical transport member 140 to be incident on the optical transport member 140 again.

By virtue of such a construction, light discharged from the light source 110 enters into the optical transport member 140 through the light incident portion 142. While passing through the light incident portion 142, the light is refracted due to a difference in refractive index between the optical transport member 140 and a medium, for example, air, between the light source 110 and the optical transport member 140. An LED generally emits light at an azimuth angle A1 of ±90 degrees. When a refractive index of the optical transport member 140 is 1.5, an angle A2 of light having passed through the light incident portion 142 with respect to the light travelling direction T is about ±42 degrees. The outer peripheral surfaces 144 of the body portion 143 become a boundary surface with the external medium, namely, air. The light experiences repeated total reflection and then is emitted through the light emitting portion 141. After the light enters into the light guide panel 120 through the edge surface 122, it is passed through the optical angle converter 130 and emitted through the top surface 121 to illuminate the liquid crystal panel 200. The liquid crystal panel 200 modulates the incident light in response to image data to output the light. Each color of light respectively output from the liquid crystal panels 200R, 200G and 200B is synthesized by the synthesis prism 300 and projected onto the screen S through the reflecting mirror 500 by the projection optical system 400.

According to the present embodiment employing the light guide panel 120, a projection display that is smaller than a conventional projection display using a plurality of mirrors and lenses can be realized. Further, the light emitting devices 112, such as LEDs, have a longer life span than a metal halide lamp or a high pressure mercury lamp.

To obtain a brighter image on the screen S, more light must be emitted from the light source 110. In particular, when the light emitting devices 112, such as LEDs, are used as the light source 110, the amount of light made by one light emitting device 112 is not sufficient generally. Thus, it is necessary to use a plurality of light emitting devices 112. When the light emitting devices 112 are directly installed at the edge surface of the light guide panel 120 without using the optical transport member 140, the number of the light emitting devices 112 arranged is restricted due to the size of the light guide panel 120. The light guide panel 120 used in the projection display is about one inch wide and one inch long. Therefore, the number of the light emitting devices 112 directly installed at the edge surface 122 is limited.

However, according to the present embodiment, the optical transport member 140 including the light incident portion 142 having a larger sectional area than the edge surface 122 is interposed between the light source 110 and the edge surface 122 of the light guide panel 120. As a consequence, a larger number of light emitting devices can be disposed than in a case where the light emitting devices 112 are directly installed at the edge surface 122 of the light guide panel 120, thereby obtaining a brighter image on the screen S. While a series of light emitting device arrays 113 are described according to the present embodiment, this is illustrative only and is not intended to limit the scope of the present invention. To obtain a necessary brightness on the screen S, two or more light emitting device arrays 113 can be provided.

Now, an illumination module employed in the projection display according to other exemplary embodiments of the present invention will be explained. Elements which have already been described above will be given the same reference numerals and will not be described again.

Figure 5:
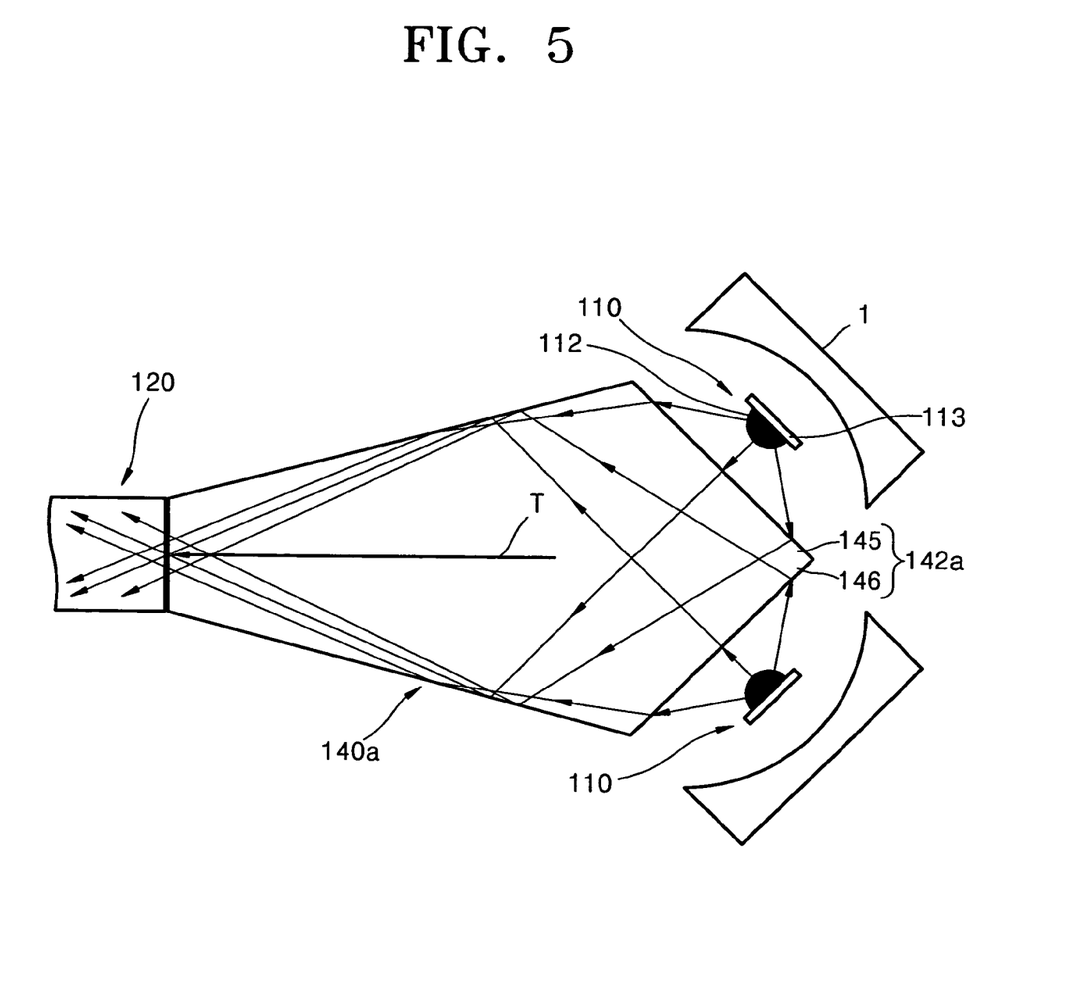
FIG. 5 is a cross-sectional view of an illumination module employed in the projection display according to a second exemplary embodiment of the present invention.

FIG. 5 is a cross-sectional view of an illumination module employed in the projection display according to a second exemplary embodiment of the present invention. An optical transport member 140a of the present embodiment is made by modifying the structure of the light incident portion of the optical transport member 140 shown in FIG. 4.

Referring to FIG. 5, a light incident portion 142a of the optical transport member 140a includes a first light incident surface 145 and a second light incident surface 146. The first light incident surface 145 and the second light incident surface 146 are inclined relative to a direction T in which light travels. The light source 110 is installed to project light to the first light incident surface 145 and the second light incident surface 146. In the exemplary embodiment, the light emitting device array 113 is used as the light source 110, and one or more light emitting devices 113 are arranged to respectively correspond to the first and second light incident surfaces 145 and 146.

As explained above, since two or more inclined light incident surfaces 145 and 146 are disposed on the light incident portion 142a, an effective area on which the light source 110 can be installed is increased. As a result, a larger number of light emitting devices 112 can be disposed, thereby enabling creation of a brighter image on the screen S.

While two light incident surfaces are provided according to the present embodiment, this is illustrative only and is not intended to limit the scope of the present invention. Three or more light incident surfaces can be provided if necessary.

Figure 6:
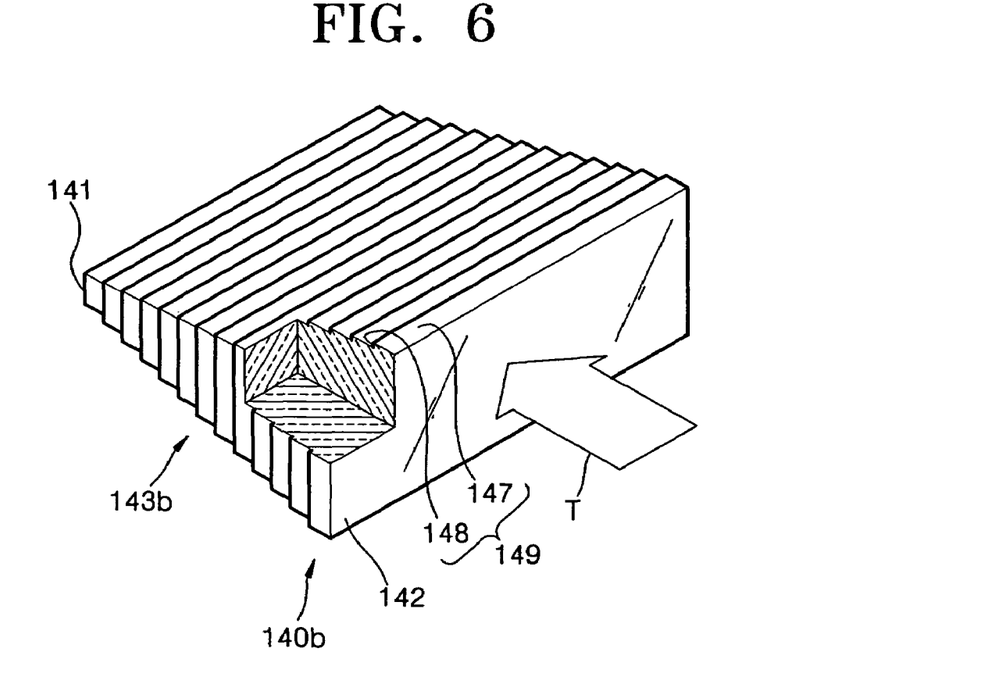
FIG. 6 is a perspective view of an illumination module employed in the projection display according to a third exemplary embodiment of the present invention.

FIG. 6 is a perspective view of an illumination module employed in the projection unit according to a third exemplary embodiment of the present invention. An optical transport member 140b of the third exemplary embodiment is made by modifying the structure of the body portion of the optical transport member 140 shown in FIG. 4.

Referring to FIG. 6, a body portion 143b of the optical transport member 140b includes a plurality of stair portions 149 having a first surface 147 parallel to the light travelling direction T and a second surface 148 forming a predetermined angle with the first surface 147. Thus, the overall shape of the body portion 143b looks like stairs connecting the light incident portion 142 to the light emitting portion 141.

The second surface 148 is processed using a reflection coating to reflect light into the inside of the body portion 140b. An angle between the first surface 147 and the second surface 148, and the number of the stair portions 149, are properly determined to increase the amount of light reaching the edge surface 122 of the light guide panel 120. The second surface 148 is orthogonal to the first surface 147 according to the present embodiment.

According to the present embodiment constructed as above, the first surface 147 becomes a boundary surface between air which is an external medium and the optical transport member 140b. When a refractive index of the optical transport member 140b is 1.5, a critical angle is approximately 42 degrees. Light entering into the inside through the light incident portion 142 has an angle of ±42 degrees with respect to the light travelling direction T. Therefore, although the light is incident on the first surface 147, it is almost totally reflected. Further, since the second surface 148 is processed to reflect light, light incident on the second surface is also almost reflected. As a result, light is transported from the light incident portion 142 to the light emitting portion 141 and then incident on the light guide panel 120.

In general, a light reflectance under a total reflection condition is higher than a reflectance on a surface which is processed to reflect light. According to the present embodiment in which the first surface 147 uses the total reflection condition and the second surface 148 is processed to reflect light, optical loss during a reflection process can be reduced as compared with the first exemplary embodiment shown in FIGS. 3 and 4 in which the outer peripheral surfaces 144 are processed to reflect light as a whole. In consequence, since light emitted from the light source 110 can be substantially transported to the light guide panel 120, light can be used efficiently.

Figure 7:
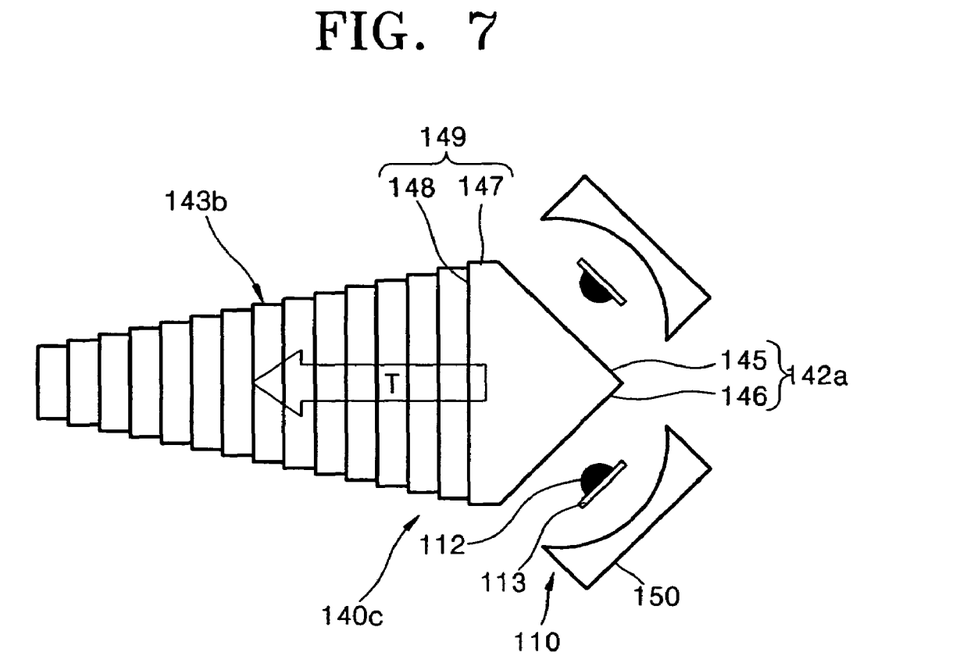
FIG. 7 is a cross-sectional view of an illumination module employed in the projection display according to a fourth exemplary embodiment of the present invention.

FIG. 7 is a cross-sectional view of an illumination module employed in the projection display according to a fourth exemplary embodiment of the present invention. The embodiment shown in FIG. 7 is a combination of the third exemplary embodiment shown in FIG. 6 and the second exemplary embodiment shown in FIG. 5, and thus will be explained in short to avoid redundancy.

Referring to FIG. 7, an optical transport member 140c includes a light incident portion 142a having a first light incident surface 145 and a second light incident surface 146 which are inclined relative to the light travelling direction T, and a body portion 143b having a plurality of stair portions 149 each of which includes a first surface 147 parallel to the light travelling direction T and a second surface 148 processed to reflect light, the first surface 147 and the second surface 148 forming a predetermined angle therebetween. The number of the light incident surfaces can be three or more if necessary. In the present embodiment, the light emitting device array 113 is used as the light source 110, and one or more light emitting device arrays 113 are positioned to correspond to the light incident surfaces 145 and 146.

According to the present embodiment constructed as above, an effective area on which light source 110 can be installed is increased, such that a larger number of light emitting devices 112 can be installed. Further, optical loss occurring during a reflection process is minimized by using the total reflection, thereby further improving the brightness of an image. While the optical transport members 140b and 140c illustrated in FIGS. 6 and 7 have the stair portions 149 which are formed on four sides of the body portion 143b, this is illustrative only and is not intended to limit the scope of the present invention. The stair portions 149 may be formed on only one pair of surfaces out of two pairs of surfaces facing each other in the body portion 143b.

Figure 8:
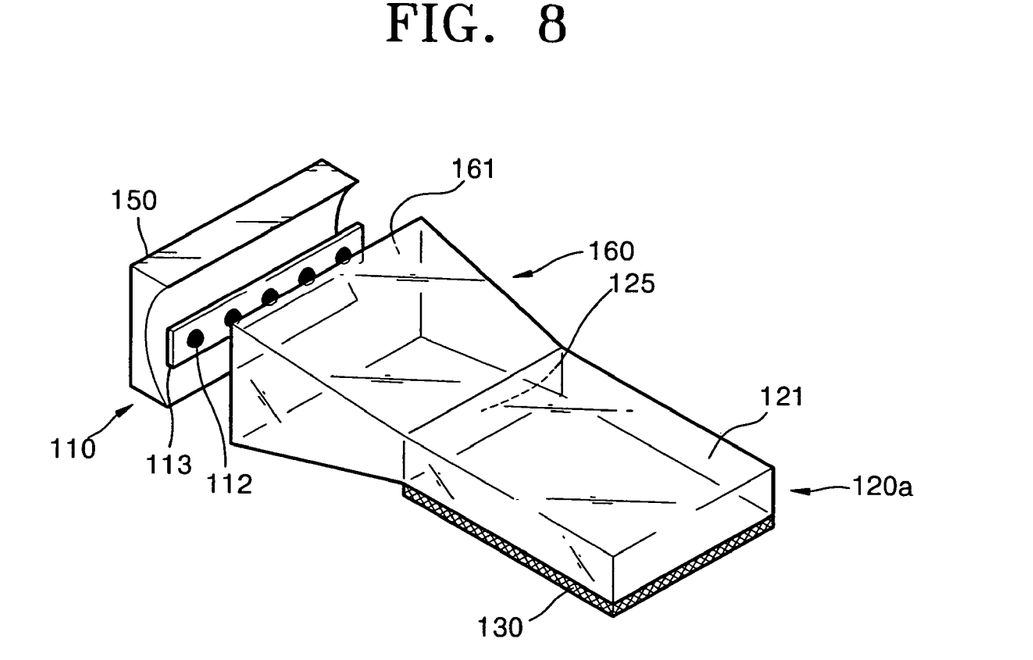
FIG. 8 is a perspective view of an illumination module employed in the projection display according to a fifth exemplary embodiment of the present invention.
Figure 9:
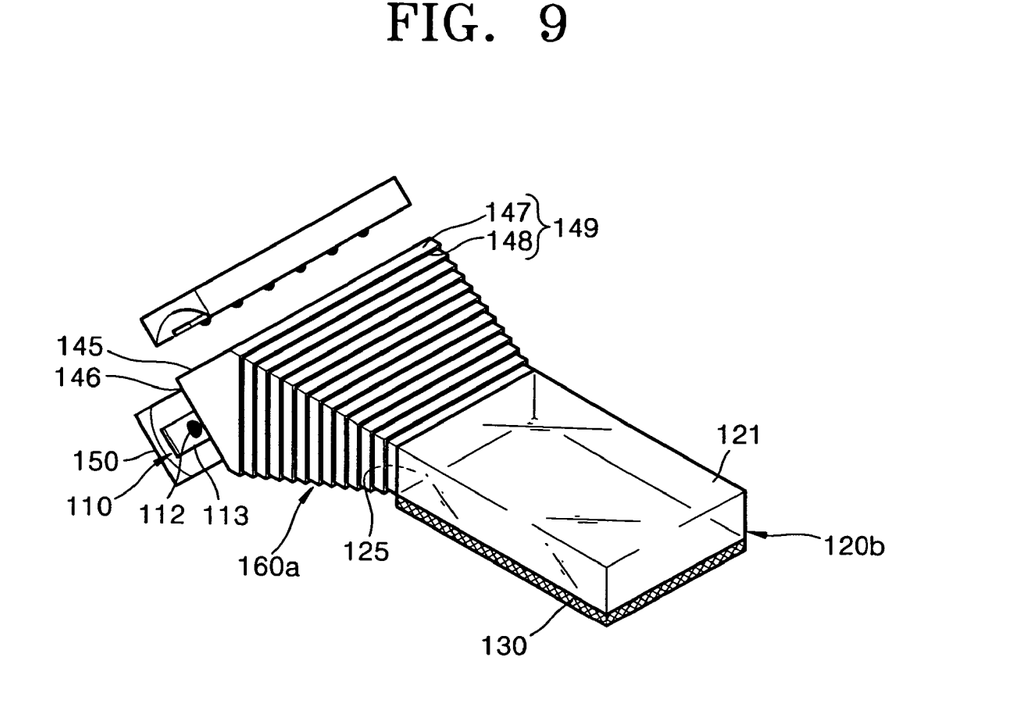
FIG. 9 is a perspective view of an illumination module employed in the projection display according to a sixth exemplary embodiment of the present invention.

The optical transport member in the above-described exemplary embodiments may be integrally formed with the light guide panel. FIG. 8 is a perspective view of an illumination module according to a fifth exemplary embodiment of the present invention, and FIG. 9 is a perspective view of an illumination module according to a sixth exemplary embodiment of the present invention. The illumination module depicted in FIGS. 8 and 9 is made by integrally forming the optical transport member with the light guide panel shown in FIGS. 3 and 7. It goes without saying that, although not shown in drawings, the optical transport member shown in FIGS. 5 and 6 can be integrally formed with the light guide panel.

Referring to FIG. 8, a light guide panel 120a includes a top surface 121 from which light is emitted, the top surface 121 facing the liquid crystal panel 200, and an optical transport portion 160 extending from a virtual edge surface 125 crossing the top surface 121 and increasing in size from the virtual edge surface 125 toward the light source 110. As previously described in the first exemplary embodiment shown in FIG. 4, the outer peripheral surfaces of the optical transport portion 160 other than a surface 161 facing the light source 110 are preferably processed to reflect light. Other elements are the same in structure and function as those in the first exemplary embodiment shown in FIG. 4.

Referring to FIG. 9, a light guide panel 120b includes a top surface 121 from which light is emitted, the top surface 121 facing the liquid crystal panel 200, and an optical transport portion 160a extending from a virtual edge surface 125 crossing the top surface 121 and increasing in size from the virtual edge surface 125 toward the light source 110. The optical transport portion 160a allows light to propagate therethrough, and includes a first light incident surface 145 and a second light incident surface 146 which are inclined relative to a light travelling direction T, and a plurality of stair portions 149 each having a first surface 147 parallel to the light travelling direction T and a second surface 148 processed to reflect light, the first surface 147 and the second surface 148 forming a predetermined angle therebetween. Other elements are the same as those shown in FIG. 7.

When comparing the fifth and sixth exemplary embodiments shown in FIGS. 8 and 9 with the first and fourth exemplary embodiments shown in FIGS. 4 and 7, the operation and effect is similar. However, according to the fifth and sixth exemplary embodiments, since the optical transport members 160 and 160a are integrally formed with the light guide panel 120a and 120b, respectively, the number of mediums through which light passes is advantageously reduced. Thus, optical loss occurring along an optical path to the liquid crystal panel 200 is reduced. Furthermore, since the number of parts is reduced, process efficiency in manufacturing a projection display is increased.

Figure 10:
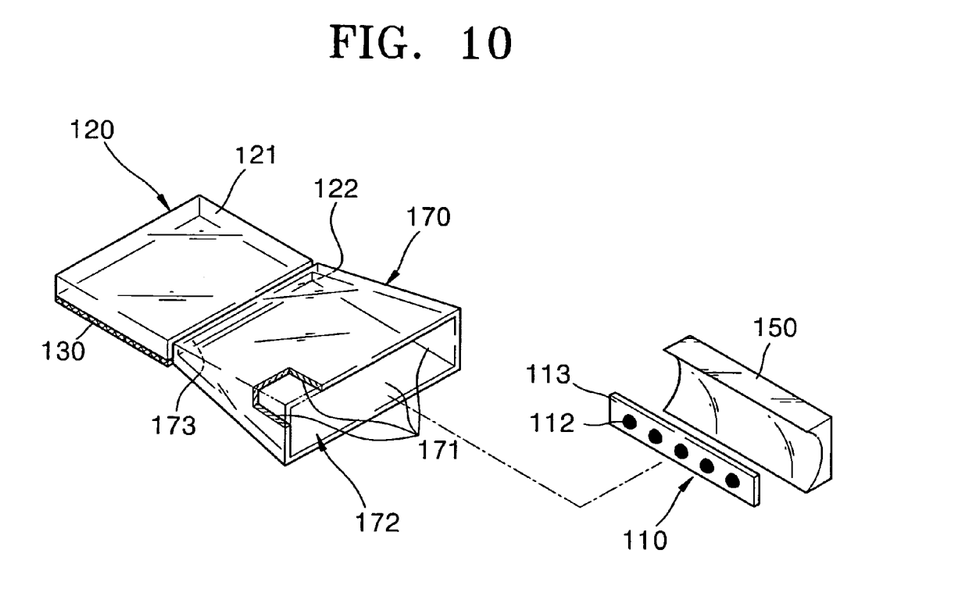
FIG. 10 is a perspective view of an illumination module employed in the projection display according to a seventh exemplary embodiment of the present invention.

FIG. 10 is a perspective view of an illumination module employed in the projection display according to a seventh exemplary embodiment of the present invention.

Referring to FIG. 10, a light tunnel 170 in the form of a hollow rectangular pipe is used as the optical transport member. The inner walls 171 of the light tunnel 170 are processed to reflect light. Both end portions of the light tunnel 170 communicate with each other, and are opened such that they function as a light incident portion 172 into which light enters and a light emitting portion 173 facing the edge surface 122 of the light guide panel 120. In the present embodiment a sectional area of the light incident portion 172 is larger than that of the edge surface 122 of the light guide panel 120. Therefore, the light tunnel 170 is configured to increase in sectional area from the light emitting portion 173 toward the light incident portion 172 as a whole. In the present embodiment the light emitting portion 173 is formed in contact with the edge surface 122 of the light guide panel 120.

Light emitted from the light source 110 and entering through the light incident portion 172 undergoes repeated reflection on the inner walls 171 to be transported to the light emitting portion 173, and then incident on the light guide panel 120 through the edge surface 122.

According to the seventh exemplary embodiment constructed as above, since the sectional area of the light incident portion 172 is greater than that of the edge surface 122 of the light guide panel 120, a larger number of light emitting devices 112 can be installed, leading to a brighter image on the screen S, as compared with a case where the light emitting devices 112 are directly installed at the edge surface 122 of the light guide panel 120.

The projection display according to the present invention has the following effects.

First, since the light guide panel is employed in the illumination module, a projection display that is smaller than a conventional projection display using a plurality of mirrors and lenses can be realized.

Second, since the light emitting device, such as an LED, has a longer life span than a metal halide lamp or a high pressure mercury lamp, inconvenience of replacing the light source often can be eliminated.

Third, since a physical space in which the light emitting devices can be arranged is enlarged by virtue of the optical transport member, brightness of an image can be improved.

Fourth, since the optical transport member is integrally formed with the light guide panel, optical loss along an optical path spanning from the light source to the optical modulator can be reduced, and the number of parts can be reduced, thereby enhancing process efficiency in manufacturing a projection display.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A projection display comprising:
   an illumination module; and
   an optical modulator for modulating light incident from the illumination module in response to image data,
   wherein the illumination module comprises:
   a light source comprising a plurality of light emitting devices;
   a light guide panel comprising a top surface from which light is emitted, the top surface facing the optical modulator, and an edge surface on which light is incident, the light guide panel having a rectangular cross section; and
   an optical transport member for guiding light emitted from the light source to the edge surface of the light guide panel, the cross-sectional area of the optical transport member parallel to the edge surface increasing from the edge surface to the light source,
   wherein the optical transport member is made of a transparent material, and comprises a light emitting portion facing the edge surface, a light incident portion facing the light source, and a body portion connecting the light incident portion to the light emitting portion, and
   wherein the body portion comprises a plurality of stair portions each of which comprises a first surface parallel to a direction in which the light travels and a second surface reflection-processed, the first surface and the second surface forming a predetermined angle therebetween.

2. The projection display of claim 1, wherein the second surface is orthogonal to the first surface.

3. The projection display of claim 1, wherein the light incident portion comprises a plurality of light incident surfaces which are inclined with respect to the light traveling direction.

4. The projection display of claim 3, wherein the light source comprises a plurality of light emitting device arrays in which a plurality of light emitting devices are aligned, and at least one light emitting device array is positioned to correspond to the light incident surface.

5. The projection display of claim 4, wherein the light emitting device comprises a light emitting diode.

6. A projection display comprising:
   an illumination module; and
   an optical modulator for modulating light incident from the illumination module in response to image data,
   wherein the illumination module comprises:
   a light source comprising a plurality of light emitting devices;

a light guide panel comprising a top surface from which light is emitted, the top surface facing the optical modulator, and an edge surface on which light is incident, the light guide panel having a rectangular cross section; and an optical transport member for guiding light emitted from the light source to the edge surface of the light guide panel, the cross-sectional area of the optical transport member parallel to the edge surface increasing from the edge surface to the light source, wherein the optical transport member is made of a transparent material, and comprises a light emitting portion facing the edge surface, a light incident portion facing the light source, and a body portion connecting the light incident portion to the light emitting portion, and wherein the body portion comprises a plurality of stair portions having a first surface parallel to a light traveling direction and a second surface reflection-processed, the first surface being orthogonal to the second surface, the light incident portion comprises a plurality of light incident surfaces which are inclined with respect to the light traveling direction, the light source comprises a plurality of light emitting device arrays in which a plurality of light emitting devices are aligned, and at least one light emitting device array is positioned to correspond to the light incident surface.

7. The projection display of claim 6, wherein the light emitting device comprises a light emitting diode.

8. The projection display of claim 7, wherein the optical transport member is made of a material having the same refractive index as the light guide panel.

* * * * *